United States Patent
Skaf (10) Patent No.: US 9,617,972 B1
(45) Date of Patent: Apr. 11, 2017

(54) APPARATUS FOR CONVERTING WAVE MOTION ON A BODY OF WATER INTO ELECTRICAL POWER

(71) Applicant: Robert Georges Skaf, Thunder Bay (CA)

(72) Inventor: Robert Georges Skaf, Thunder Bay (CA)

( * ) Notice: Subject to any disclaimer, the term of this patent is extended or adjusted under 35 U.S.C. 154(b) by 7 days.

(21) Appl. No.: 14/872,594

(22) Filed: Oct. 1, 2015

(51) Int. Cl.
  *B60L 11/12* (2006.01)
  *H02P 9/04* (2006.01)
  *F03B 13/20* (2006.01)
  *H02K 7/18* (2006.01)
  *F03B 13/10* (2006.01)

(52) U.S. Cl.
  CPC ......... *F03B 13/20* (2013.01); *H02K 7/1807* (2013.01)

(58) Field of Classification Search
  USPC ..................................... 290/50, 53
  See application file for complete search history.

(56) References Cited

U.S. PATENT DOCUMENTS

| | | | |
|---|---|---|---|
| 3,231,749 A * | 1/1966 | Hinck, III | F03B 13/20 290/53 |
| 3,696,251 A * | 10/1972 | Last | F03B 13/1855 290/53 |
| 3,977,739 A * | 8/1976 | Moskowitz | F16C 33/6644 184/109 |
| 4,110,630 A * | 8/1978 | Hendel | F03B 13/12 290/42 |
| 4,196,591 A * | 4/1980 | Wallace | F03B 13/1895 417/332 |
| 4,260,901 A * | 4/1981 | Woodbridge | F03B 13/1855 290/42 |
| 4,266,143 A * | 5/1981 | Ng | F03B 13/20 290/42 |
| 4,340,821 A * | 7/1982 | Slonim | F03B 13/187 290/53 |
| 4,389,843 A * | 6/1983 | Lamberti | F03B 13/1815 290/42 |
| 4,423,334 A * | 12/1983 | Jacobi | F03B 13/20 290/42 |
| 4,492,875 A * | 1/1985 | Rowe | F03B 13/20 290/44 |
| 4,531,063 A * | 7/1985 | Vielmo | F03B 13/1895 290/53 |
| 4,843,250 A | 6/1989 | Stupakis | |
| 5,816,874 A * | 10/1998 | Juran | B63B 22/04 441/1 |
| 6,768,230 B2 * | 7/2004 | Cheung | F16C 33/1035 290/1 R |

(Continued)

*Primary Examiner* — Pedro J Cuevas
(74) *Attorney, Agent, or Firm* — Ted Masters (57) ABSTRACT

Apparatus for converting wave motion on a body of water into electrical power, includes a floatable housing in which an electrical power generating unit is disposed. The electrical power generating unit includes a rotatable axle to which at least one electrical generator is connected. A weight is connected to the rotatable axle by an arm, so that when the weight rotates due to wave motion the electrical generator generates electrical power. In one embodiment gearing connects the electrical generator to the axle. In another embodiment the weight rolls on the floor of the housing. And in another embodiment the weight includes at least one battery.

9 Claims, 8 Drawing Sheets

(56) References Cited

U.S. PATENT DOCUMENTS

| | | | |
|---|---|---|---|
| 6,809,427 B2* | 10/2004 | Cheung | H02K 35/02 290/1 R |
| 6,812,583 B2* | 11/2004 | Cheung | H02K 35/02 290/1 A |
| 7,009,310 B2* | 3/2006 | Cheung | B60C 23/041 290/1 R |
| 7,239,038 B1* | 7/2007 | Zimmerman | F03B 13/20 290/42 |
| 7,453,165 B2* | 11/2008 | Hench | F03B 13/20 290/42 |
| 7,629,704 B2* | 12/2009 | Hench | F03B 13/20 290/42 |
| 7,737,569 B2* | 6/2010 | Hench | F03B 13/20 290/42 |
| 7,755,224 B2* | 7/2010 | Beane | F03B 13/20 290/42 |
| 7,989,975 B2* | 8/2011 | Clement | F03B 13/20 290/53 |
| 8,004,104 B2* | 8/2011 | Hench | F03B 13/20 114/230.27 |
| 8,046,108 B2* | 10/2011 | Hench | F03B 13/20 290/42 |
| 8,198,745 B2* | 6/2012 | Laz | F03B 13/20 290/42 |
| 8,269,365 B2* | 9/2012 | Clement | F03B 13/20 290/1 R |
| 8,330,286 B2* | 12/2012 | Laz | F03B 13/20 290/42 |
| 8,334,605 B2* | 12/2012 | Catinella | F03B 13/182 290/42 |
| 8,446,027 B2* | 5/2013 | Laz | F03B 13/20 290/42 |
| 8,525,360 B2* | 9/2013 | Ono | F03B 13/20 290/42 |
| 8,701,403 B2* | 4/2014 | Beane | F03B 13/20 290/42 |
| 8,901,766 B2* | 12/2014 | Werjefelt | F03B 13/20 290/53 |
| 8,920,203 B2* | 12/2014 | Harrington | B63C 7/26 441/25 |
| 9,260,331 B2* | 2/2016 | Park | C02F 3/14 |
| 9,394,878 B2* | 7/2016 | Chen | F03B 13/20 |
| 9,410,538 B2* | 8/2016 | Barsacq | F03B 13/14 |
| 2003/0155771 A1* | 8/2003 | Cheung | H02K 35/02 290/1 R |
| 2004/0155467 A1* | 8/2004 | Cheung | H02K 35/02 290/1 R |
| 2007/0138793 A1* | 6/2007 | Zimmerman | F03B 13/20 290/1 R |
| 2007/0251230 A1* | 11/2007 | Zimmerman | F03B 13/20 60/497 |
| 2008/0016860 A1* | 1/2008 | Kornbluh | F03B 13/1845 60/398 |
| 2008/0093858 A1* | 4/2008 | Hench | F03B 13/20 290/53 |
| 2009/0008942 A1* | 1/2009 | Clement | F03B 13/20 290/53 |
| 2009/0127856 A1* | 5/2009 | Hench | F03B 13/20 290/42 |
| 2009/0160191 A1* | 6/2009 | Beane | F03B 13/20 290/53 |
| 2011/0042954 A1* | 2/2011 | Werjefelt | F03B 13/20 290/53 |
| 2013/0319921 A1* | 12/2013 | Park | C02F 3/14 210/167.3 |
| 2014/0162509 A1* | 6/2014 | Harrington | B63C 7/26 441/6 |
| 2014/0265340 A1* | 9/2014 | Hench | F03B 13/20 290/53 |
| 2016/0377047 A1* | 12/2016 | Ghiringhelli | F03B 13/186 290/53 |

\* cited by examiner

Fig_14

Fig_15

APPARATUS FOR CONVERTING WAVE MOTION ON A BODY OF WATER INTO ELECTRICAL POWER

CROSS REFERENCE TO RELATED APPLICATION

None

TECHNICAL FIELD

The present invention pertains generally to power generation, and more particularly to a fully enclosed floating power generating system which converts the kinetic energy of waves on a body of water into electrical energy.

BACKGROUND OF THE INVENTION

Systems which harness sea wave energy are known in the art. In one approach energy is generated when floating modules move up and down in response to wave action. In other systems the power generating mechanism uses the vertical motion inherent in the movement of waves to effect a corresponding displacement of a component of the generating system. Other systems utilize pendulums or the movement of fluid to generate power from wave motion. And still other systems utilize the tilting motion of a floating module to generate electrical power.

BRIEF SUMMARY OF THE INVENTION

The present invention is directed to apparatus for converting the energy of waves on a body of water into electrical power. The apparatus includes an electrical power generating unit which is enclosed in a compact, sealed, waterproof floating container (module) which protects the components from the elements of water, wind, salt, ice, and floating debris.

In accordance with an embodiment, apparatus for converting wave motion on a body of water into electrical power includes a floatable housing. An electrical power generating unit is disposed within the floatable housing. The electrical power generating unit includes a rotatable axle. At least one electrical generator is connected to the rotatable axle. A weight is connected to the rotatable axle by an arm, so that when the weight rotates due to the wave motion the electrical generator generates electrical power.

In accordance with another embodiment, the floatable housing has a floor. The weight rolls on the floor of the floatable housing.

In accordance with another embodiment, the floatable housing has a floor and a ceiling. The weight extends from the floor to the ceiling.

In accordance with another embodiment, the weight includes at least one battery.

In accordance with another embodiment, the arm has a length. The weight is positionable along the length of the arm.

In accordance with another embodiment, the apparatus includes an electrical coil. A magnet is disposed within the electrical coil, so that the magnet can rotate 360° in both clockwise and counterclockwise directions and induce a voltage in the coil.

In accordance with another embodiment, the floatable housing includes a buoyant section disposed below the electrical power generating unit. The buoyant section causes the electrical power generating unit to be elevated with respect to the body water.

In accordance with another embodiment, the floatable housing includes a sphere.

In accordance with another embodiment, a stabilizing ring is disposed around the floatable housing.

In accordance with another embodiment, the floatable housing has a top surface. A solar panel is disposed on the top surface.

Other embodiments, in addition to the embodiments enumerated above, will become apparent from the following detailed description, taken in conjunction with the accompanying drawings, which illustrate, by way of example, the principles of the apparatus for converting wave motion on a body of water into electrical power.

DETAILED DESCRIPTION OF THE INVENTION

Figure 1:
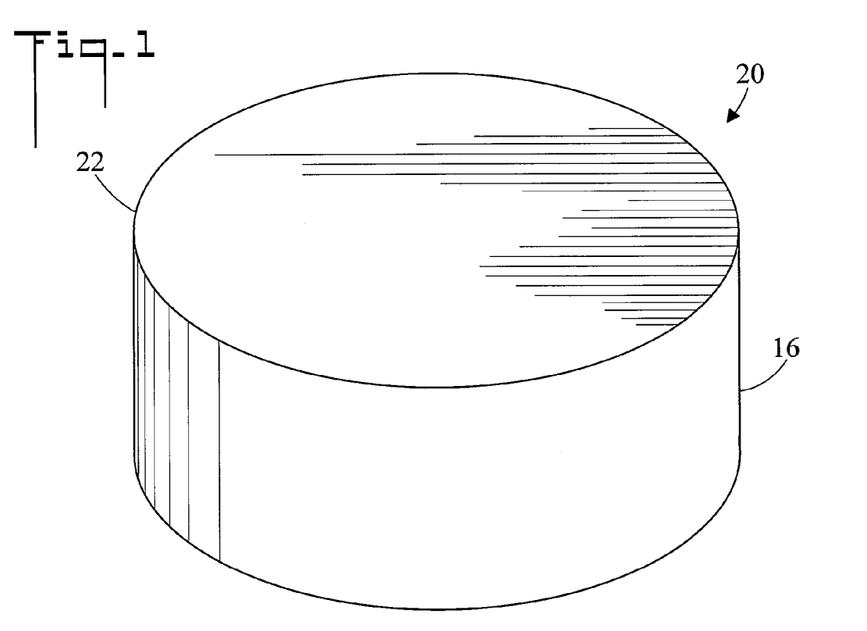
FIG. 1 is a perspective view of apparatus for converting wave motion on a body of water into electrical power.
Figure 2:
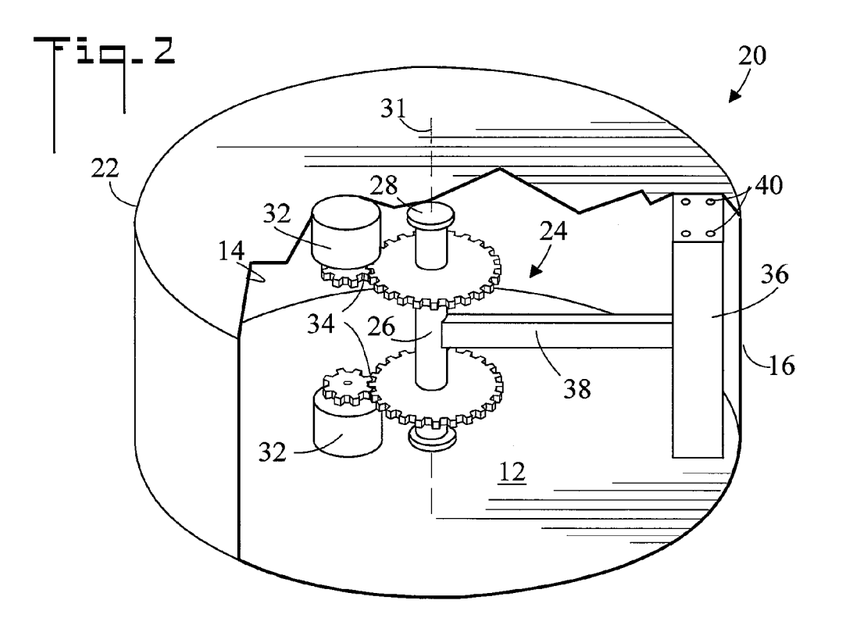
FIG. 2 is a cutaway perspective view as in FIG. 1 which shows the apparatus.
Figure 3:
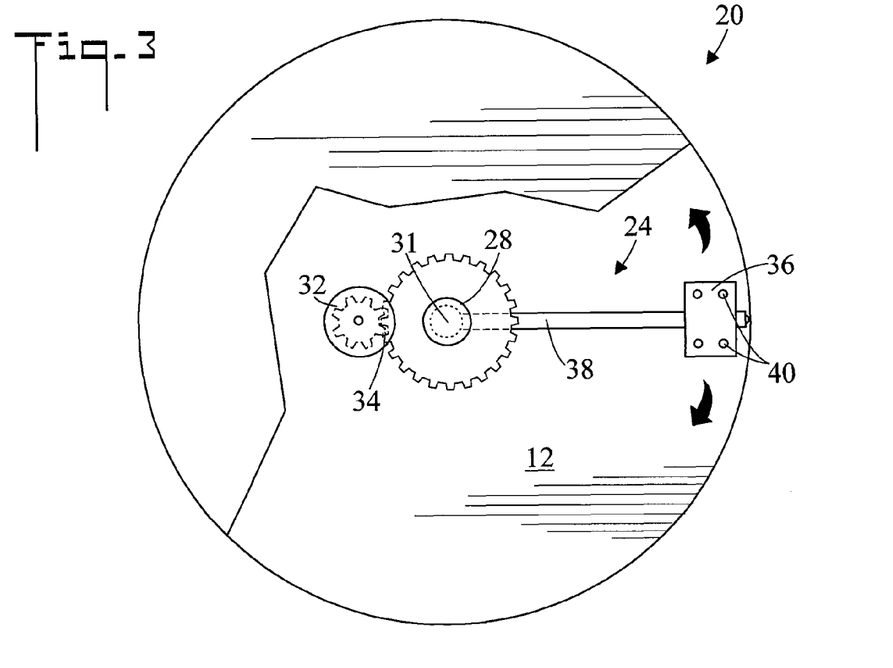
FIG. 3 is a cutaway top plan view of the apparatus.
Figure 4:
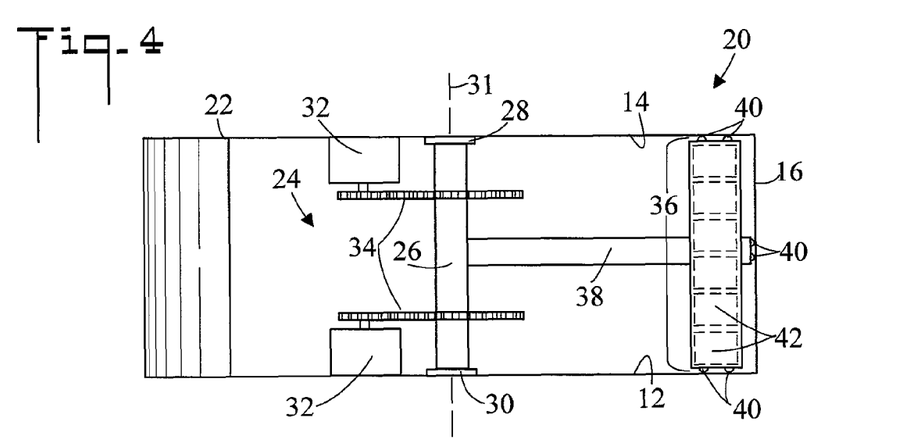
FIG. 4 is a cutaway side elevation view of the apparatus.

Referring initially to FIGS. 1 and 2 there are illustrated perspective and cutaway perspective views respectively of apparatus for converting wave motion on a body of water into electrical power, the apparatus generally designated as 20. FIGS. 3-4 show additional cutaway views of apparatus 20. Apparatus 20 includes a floatable housing 22 which has a floor 12, an opposite ceiling 14, and a wall 16. Floatable housing 22 is watertight and floats on a body of water 500 such as the ocean, a lake, etc. (also refer to FIG. 5). In the shown embodiment floatable housing 22 has a cylindrical shape, but could have other shapes (refer to FIGS. 12-14). An electrical power generating unit 24 is disposed within floatable housing 22. Electrical power generating unit 24 includes a rotatable axle 26 which is connected to floatable housing 22 by upper 28 and lower 30 bearings and rotates about a central axis 31.

At least one electrical generator 32 is connected to rotatable axle 26. In the shown embodiment two generators 32 are connected to rotatable axle 26 by gearing 34. A weight 36 is connected to rotatable axle 26 by an arm 38, so that when weight 36 rotates due to wave motion on body of water 500 electrical generator 32 generates electrical power. It is noted that weight 36 can rotate 360° in both clockwise and counterclockwise directions about central axis 31. Weight 36 is rollable on floor 12 of floatable housing 22 by rollers 40. Rollers 40 can be the shown spherical rollers, cylindrical rollers, wheels, or the like. In the shown embodiment weight 36 also has rollers 40 which abut ceiling 14 and wall 16 of floatable housing 22. In the shown embodiment, weight 36 extends from floor 12 to ceiling 14. Also in the shown embodiment weight 36 includes at least one battery 42 for storing electrical power (six batteries shown in dashed lines in FIG. 4). In another embodiment for structural and safety reasons weight 36 could roll in tracks which are disposed on floor 12.

Figure 5:
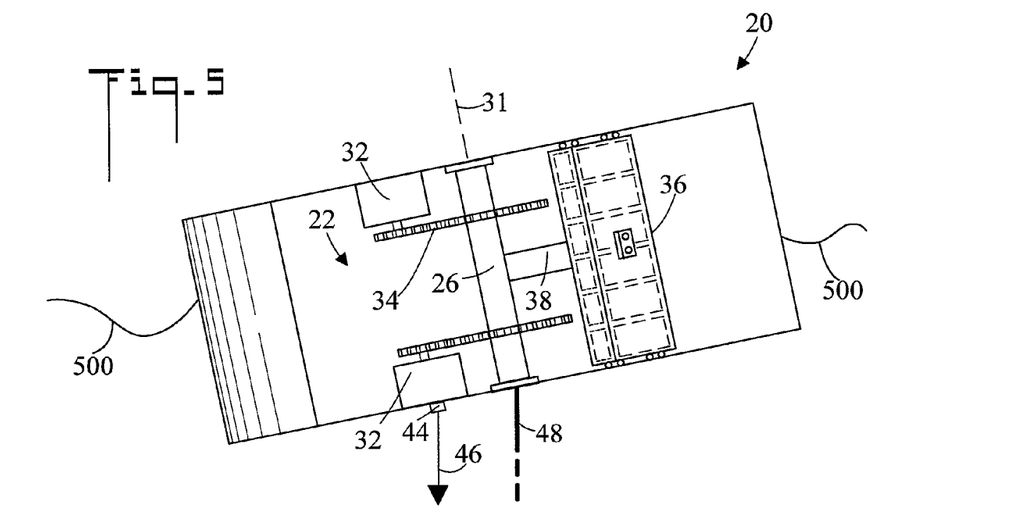
FIG. 5 is a side elevation cutaway view of the apparatus being tilted by wave motion.
Figure 6:
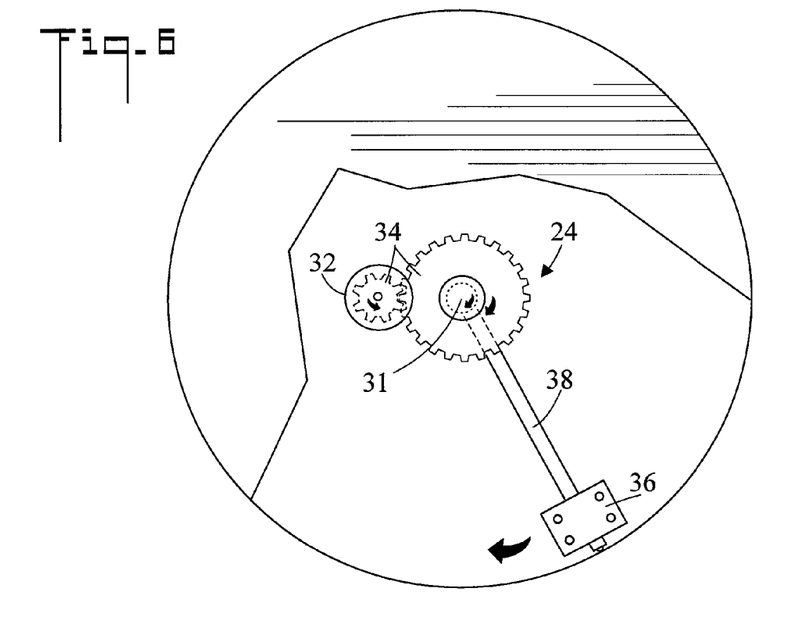
FIG. 6 is a top plan cutaway view of as in FIG. 5 showing the apparatus being tilted by wave motion.

FIGS. 5 and 6 are side elevation cutaway and top plan cutaway views respectively of apparatus 20 being tilted by wave motion on body of water 500. Wave motion in body of water 500 causes apparatus 20 to tilt. As such, through gravity weight 36 moves toward a lower position causing axle 26 to rotate around central axis 31. Ideally weight 36 would make a full circle(s) of rotation and thereby generate maximum energy. Gearing 34 couples the rotation of axle 26 to electrical generators 32 which generate electrical power. The rotation of weight 36 can be either clockwise or counterclockwise depending upon the wave motion. Electrical generators 32 can generate power rotating in both directions.

Again referring to FIG. 5, floatable housing 22 includes a sealed output port 44 which routes the power output of electrical power generating unit 24 through an electrical cable 46 to a remote location, typically on shore. In one embodiment the electrical cable is run along an anchor line 48 which anchors apparatus 20 to the floor of the body of water 500.

Figure 7:
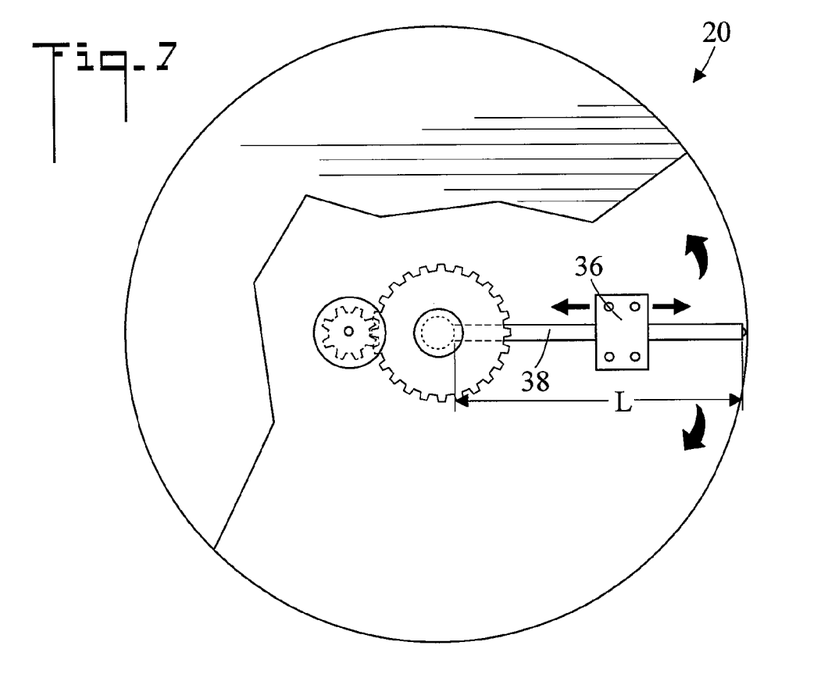
FIG. 7 is a top plan cutaway view showing a weight which is positionable along an arm.
Figure 8:
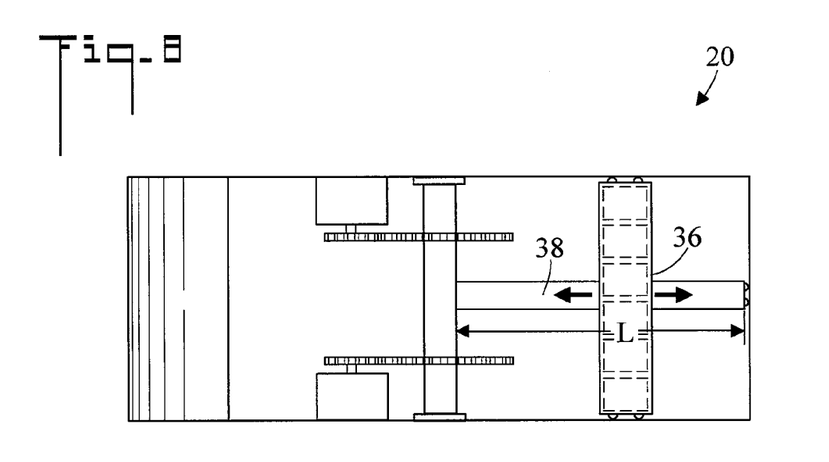
FIG. 8 is a side elevation view of FIG. 7.

FIGS. 7 and 8 are top plan cutaway and side elevation cutaway views respectively showing how weight 36 is positionable along arm 38. Arm 38 has a length L. Weight 36 is positionable and lockable at various locations along length L of arm 38. This adjustment embodiment can optimize the rotation of weight 36 as a function of various wave conditions (e.g. large waves small waves, wave period, etc.)

Figures 9, 10, 11:
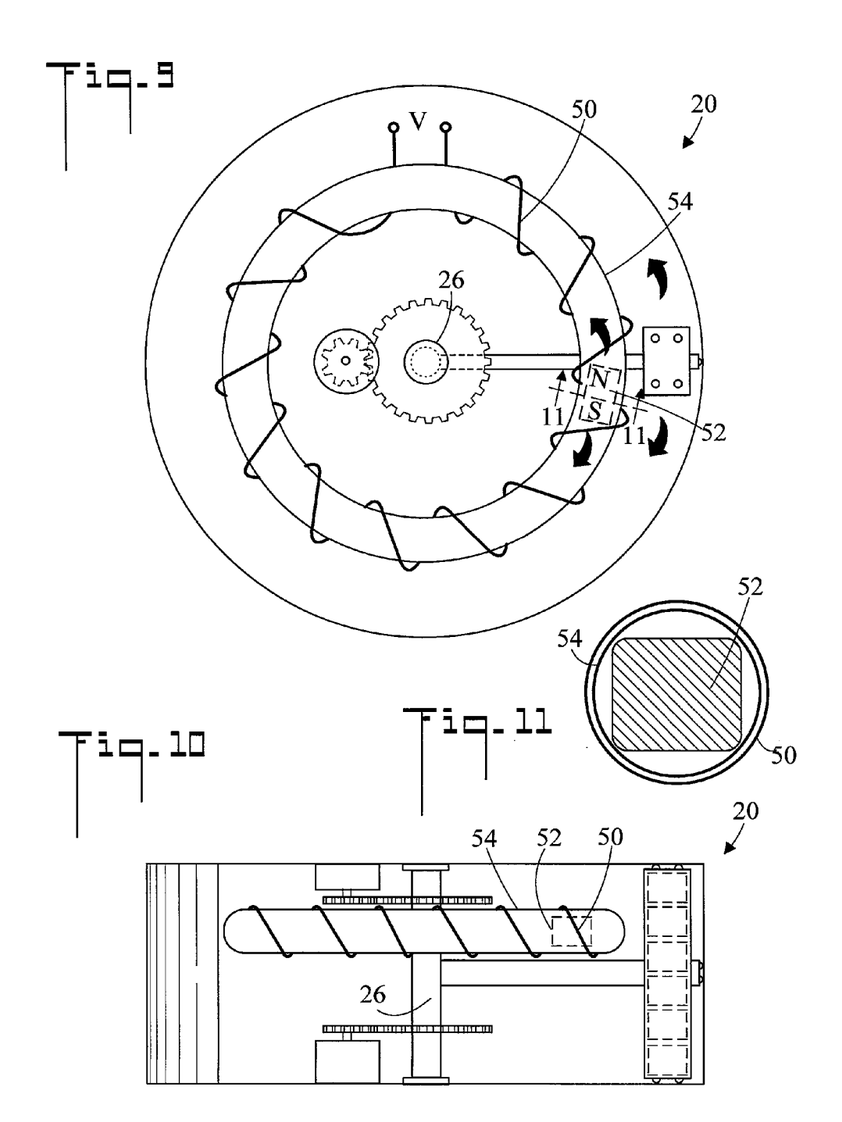
FIG. 9 is a top plan cutaway view of an embodiment of the apparatus which includes an electrical coil and magnet.
FIG. 10 is a side elevation cutaway view of FIG. 9.
FIG. 11 is an enlarged cross sectional view along the line 11-11 of FIG. 9.

FIGS. 9 and 10 are top plan cutaway and side elevation cutaway views respectively of an embodiment of apparatus 20 which includes an electrical coil 50 and a magnet 52, and FIG. 11 is an enlarged cross sectional view along the line 11-11 of FIG. 9. In the shown embodiment electrical coil 50 is wound around a tube 54. Magnet 52 is disposed within tube 54 and electrical coil 50 so that magnet 52 can rotate 360° (move within tube 54) in both clockwise and counterclockwise directions and induce a voltage V in coil 50 (via Faraday's law). As with the embodiment of FIGS. 1-6, magnet 52 moves within tube 54 and coil 50 because of gravity through wave action. In the shown embodiment coil 50 and tube 54 surround axle 26. This embodiment provides a supplemental source of electrical power in addition to that of FIG. 1-6

Figure 12:
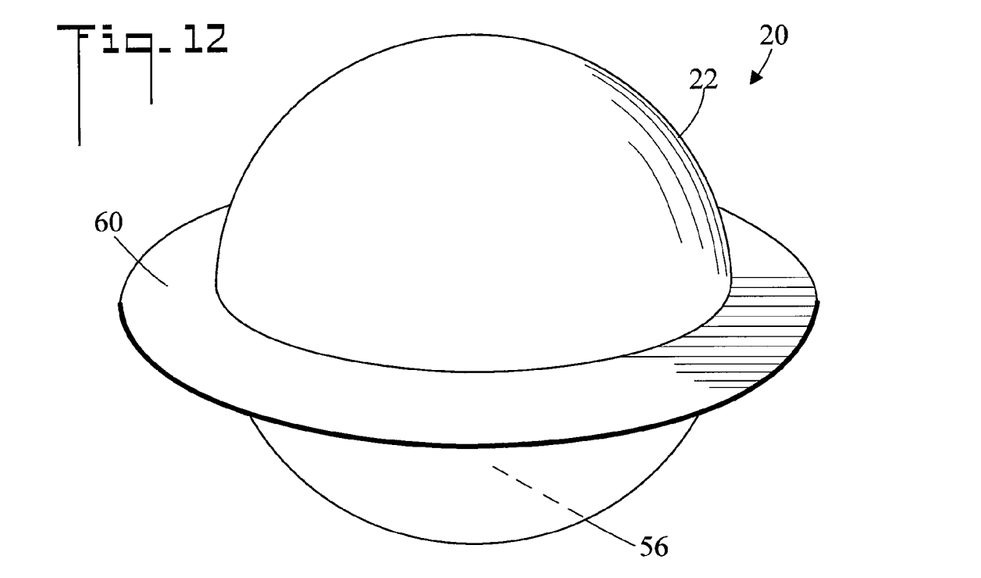
FIG. 12 is a perspective view where the floatable housing is a sphere.
Figure 13:
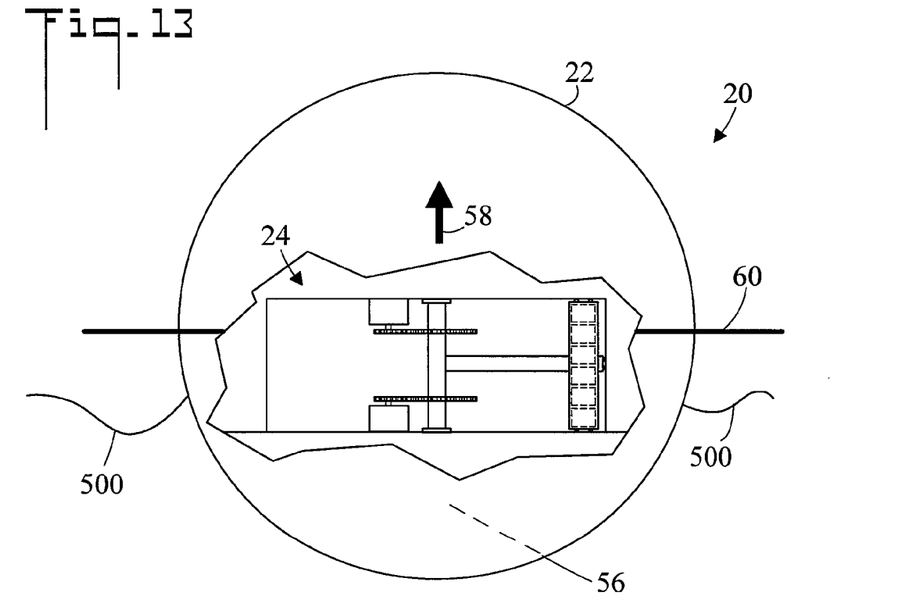
FIG. 13 is a side elevation cutaway view showing the electrical power generating unit disposed within the floatable housing.
Figure 14:
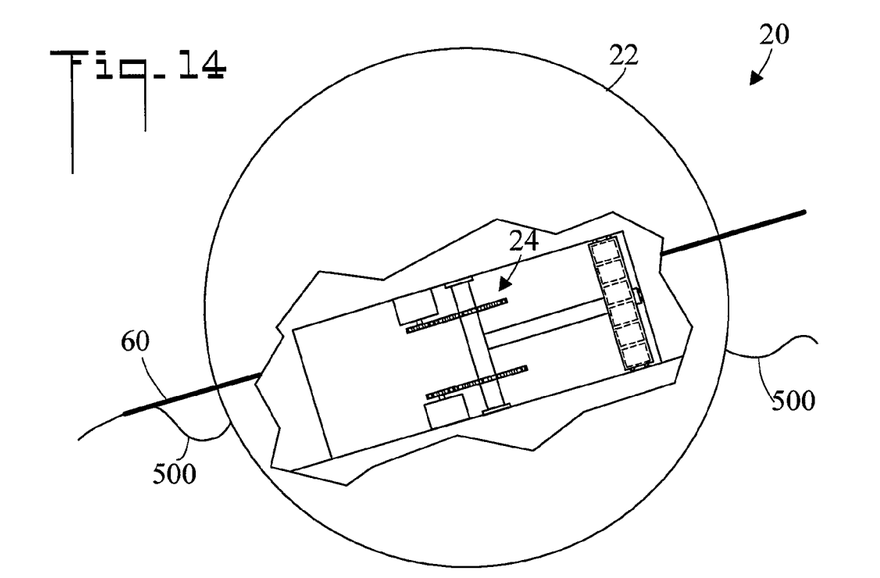
FIG. 14 is a side elevation cutaway view showing the apparatus being tilted by wave motion.

FIG. 12 is a perspective view where the floatable housing 22 is a sphere. FIG. 13 is a side elevation cutaway view showing electrical power generating unit 24 disposed within floatable housing 22. FIG. 14 is a side elevation cutaway view showing floatable housing 22 and electrical power generating unit 24 being tilted by wave motion. In this embodiment floatable housing 22 includes a buoyant section 56 (such as an empty space) disposed below electrical power generating unit 22. Buoyant section 56 causes electrical power generating unit 24 to be elevated (in direction 58) with respect to the body of water 500. That is, electrical generating unit 24 rides higher in the water. Because electrical power generating unit 24 is elevated (as compared to that of FIG. 5), its motion will be amplified causing more electrical power to be generated. Another advantage of the spherical shape is that in cold environments ice buildup would be minimized.

In the shown embodiment a flat stabilizing ring 60 is disposed around the sphere. As is best seen in FIG. 14, during severe tilting stabilizing ring 60 contacts body of water 500 and prevents floatable housing 22 from capsizing. It may be appreciated that stabilizing ring 60 could also be utilized with the embodiment of FIGS. 1-6.

Figure 15:
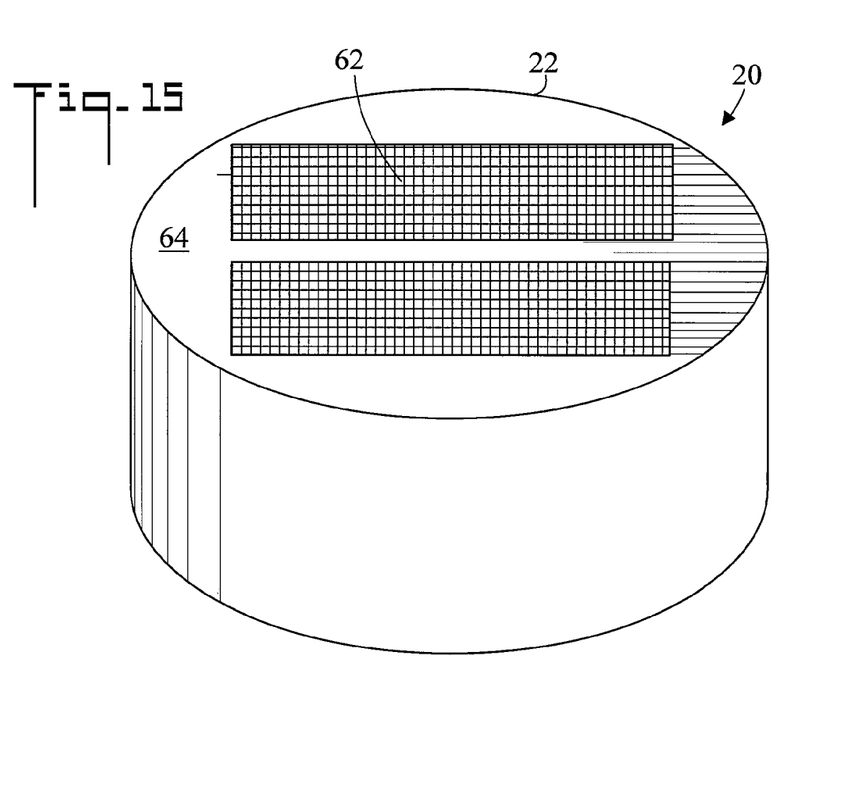
FIG. 15 is a perspective view showing solar panels disposed on the top surface of the floatable housing; and, FIG. 16 is functional block diagram of the apparatus.

FIG. 15 is a perspective view showing solar panels 62 disposed on the top surface 64 of floatable housing 22. Solar panels 62 could also be utilized with the spherical embodiment of FIGS. 12-14 which would provide a larger surface area.

Figure 16:
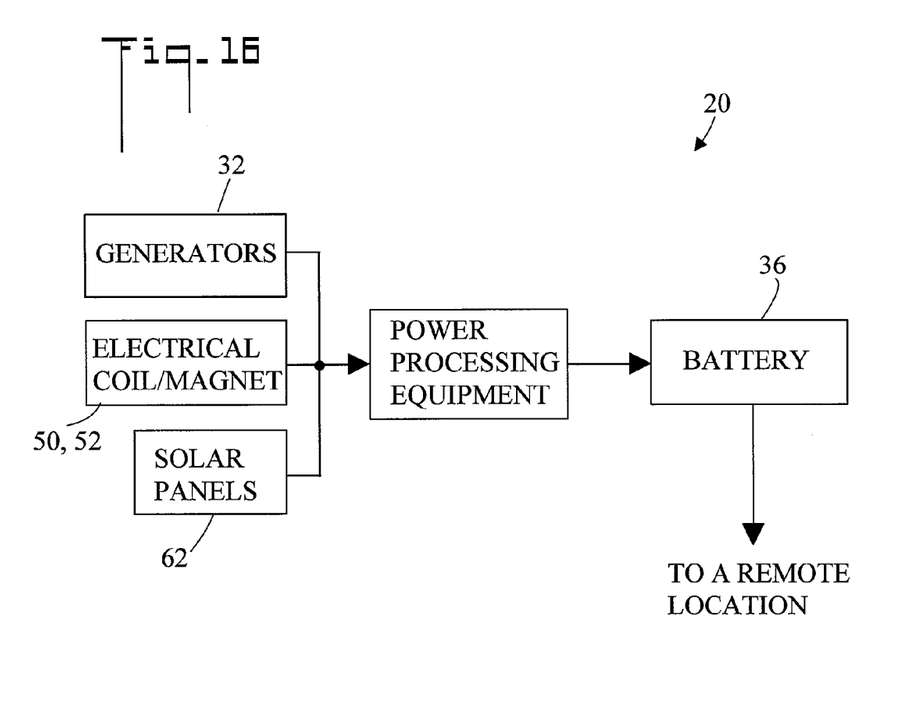

FIG. 16 is functional block diagram of apparatus 20. In an embodiment electrical power from generators 32, electrical coil 50/magnet 52, and solar panels 62 are all routed to power processing equipment 66 and then stored in batteries 42 before being transmitted to a remote location.

The embodiments of the apparatus for converting wave motion on a body of water into electrical power described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus should be construed as limiting the invention to a particular embodiment or combination of embodiments. The scope of the invention is defined by the appended claims.

I claim:

1. Apparatus for converting wave motion on a body of water into electrical power, comprising:
   a floatable housing;
   an electrical power generating unit disposed within said floatable housing, said electrical power generating unit including;
   a rotatable axle;
   at least one electrical generator connected to said rotatable axle by gearing;
   a weight connected to said rotatable axle by an arm, rotation of said weight causing said rotatable axle to rotate and said at least one electrical generator to generate electrical power, said rotation of said weight causable by the wave motion; and,
   said weight including at least one battery.

2. Apparatus for converting wave motion on a body of water into electrical power, comprising:
   a floatable housing;
   an electrical power generating unit disposed within said floatable housing, said electrical power generating unit including;
   a rotatable axle;
   at least one electrical generator connected to said rotatable axle; and,
   a weight connected to said rotatable axle by an arm, rotation of said weight causing said rotatable axle to rotate and said at least one electrical generator to generate electrical power, said rotation of said weight causable by the wave motion; and, said weight including at least one battery.

3. The apparatus according to claim 2, further including:

said floatable housing having a floor; and, said weight rollable on said floor of said floatable housing.

4. The apparatus according to claim 2, further including:

said floatable housing having a floor and a ceiling; and, said weight extending from said floor to said ceiling.

5. The apparatus according to claim 2, further including:

said arm having a length; and, said weight positionable along said length of said arm.

6. The apparatus according to claim 2, further including:

said floatable housing including a buoyant section disposed below said electrical power generating unit, said buoyant section causing said electrical power generating unit to be elevated with respect to the body water.

7. The apparatus according to claim 6, further including:

said floatable housing including a sphere.

8. The apparatus according to claim 2, further including:

a stabilizing ring disposed around said floatable housing.

9. The apparatus according to claim 2, further including:

said floatable housing having a top surface; and, a solar panel disposed on said top surface.

* * * * *